(12) United States Patent
Miller et al.

(10) Patent No.: US 8,522,332 B2
(45) Date of Patent: Aug. 27, 2013

(54) SECURE AUTOMATICALLY CONFIGURING, SELF-AUTHENTICATING ADMINISTRATIVE USER WITHOUT A PASSWORD

(75) Inventors: James Miller, Lombard, IL (US); Senthilvel Saravanan, San Jose, CA (US)

(73) Assignee: Aspect Software, Inc., Chelmsford, MA (US)

( * ) Notice: Subject to any disclaimer, the term of this patent is extended or adjusted under 35 U.S.C. 154(b) by 1317 days.

(21) Appl. No.: 11/954,527

(22) Filed: Dec. 12, 2007

(65) Prior Publication Data
US 2009/0158412 A1 Jun. 18, 2009

(51) Int. Cl.
*H04L 29/06* (2006.01)
(52) U.S. Cl.
USPC .................................. 726/8; 726/3; 726/4

(58) Field of Classification Search
USPC ...................... 726/3, 4, 8; 439/152
See application file for complete search history.

(56) References Cited

U.S. PATENT DOCUMENTS

| | | | | |
|---|---|---|---|---|
| 6,167,395 A | * | 12/2000 | Beck et al. | 707/999.003 |
| 2003/0200466 A1 | * | 10/2003 | Nelson et al. | 713/202 |
| 2004/0139355 A1 | * | 7/2004 | Axel et al. | 713/202 |
| 2007/0128899 A1 | * | 6/2007 | Mayer | 439/152 |

* cited by examiner

*Primary Examiner* — Jeffrey Pwu
*Assistant Examiner* — Thong Truong
(74) *Attorney, Agent, or Firm* — Husch Blackwell LLP

(57) ABSTRACT

A method and apparatus are provided for accessing a server of a computer system. The method includes the steps of providing a startup CONFIG file or database table for use during initialization of the server and a predetermined user identifier within the startup CONFIG file or database table. The method further includes the steps of a user requesting access to the server, the user providing the predetermined user identifier and the server logging the user into the server under the predetermined user identifier without requiring a password.

31 Claims, 1 Drawing Sheet

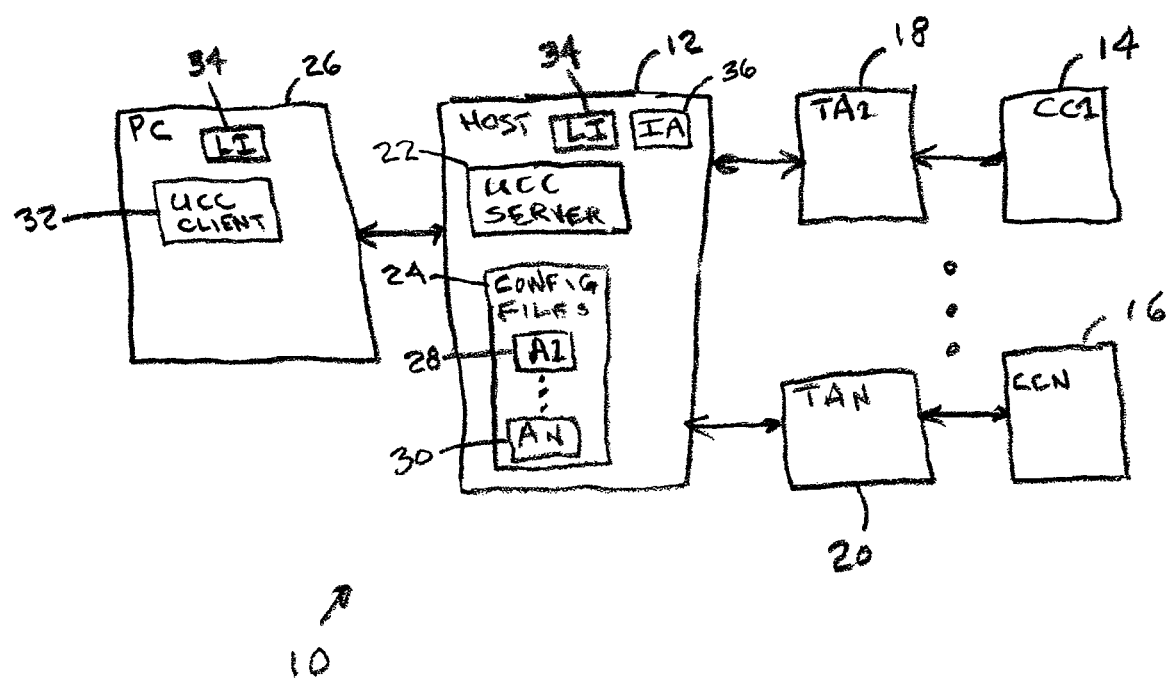

SECURE AUTOMATICALLY CONFIGURING, SELF-AUTHENTICATING ADMINISTRATIVE USER WITHOUT A PASSWORD

FIELD OF THE INVENTION

The field of the invention relates to computer systems and more particularly to interconnected computer systems.

BACKGROUND OF THE INVENTION

The difficulty of providing a single point of access to users within interconnected computer systems is generally known. The interconnection of computers is typically required whenever the task required is too large for a single computer or where specific tasks are provided by different independent systems (e.g., automatic call distribution, workforce management, quality management, etc.) and the activities of the computers must be coordinated.

Automatic call distributors (ACDs) are an example of such a situation. Workforce management, and performance optimization systems (operating within an ACD or otherwise) are examples of the different tasks that may be distributed over a number of hosts. ACDs are typically used by telemarketers and/or contact centers and are typically provided with a host computer that makes and receives calls. In addition to making and receiving calls, the host of an ACD may also act as a repository of customer records.

In order to reduce telephone costs, telemarketers often locate a number of ACDs of an ACD system near major metropolitan areas. However, during periods of overload calls may be handled through any ACD of the ACD system. As a result, the host or hosts of each ACD must be accessible from any agent station throughout the system.

While the interconnecting of hosts of ACDs works relatively well, the hosts are difficult to set up regarding the rights and privileges of users. The difficulty often arises because of the need for security and because of a need of many users to access different databases. Often the only way of providing access to a user into different databases of the system is to manually save a name and password of the user into each different host.

The need for the manual entry of data to gain access to the different databases is slow and cumbersome. Because of the importance of ACDs and of interconnected computers, a need exists for a better method of providing access rights to users within such computer systems.

SUMMARY

A method and apparatus are provided for accessing a server within a computer system. The method includes the steps of providing a startup CONFIG file or database table for use during initialization of the server and a predetermined user identifier within the startup CONFIG file or database table. The method further includes the steps of a user requesting access to the server, the user providing the predetermined user identifier and the server logging the user into the server under the predetermined user identifier without requiring a password.

BRIEF DESCRIPTION OF THE DRAWINGS

FIG. 1 is a block diagram of a computer system shown generally in accordance with an illustrated embodiment of the invention.

DETAILED DESCRIPTION OF AN ILLUSTRATED EMBODIMENT

FIG. 1 is a block diagram of a networked computer system 10 shown generally in accordance with an illustrated embodiment of the invention that allows a user to securely log in without any requirement for a password. Under the illustrated embodiment, the ability to securely log in without a password is of particular importance in the start up of new or preexisting computer systems or subsystems. Under these conditions, the configuration files of such systems are typically empty or devoid of security entries (e.g., user names and passwords) resulting in the situation where any unauthorized party could potentially log on by simply activating a desktop, accessing the system or subsystem and entering his own name and password.

The computer system 10 may be an automatic call distribution system having at least one host 12 that provides a unified command and control to the system. Connected to the host 12 may be one or more automatic call or contact distributors (ACDs), workforce management or quality management systems (together referred to hereinafter as "ACDs 14, 16"). The ACDs 14, 16 may be coupled to the host 12 through a respective terminal adapter (TA) 18, 20.

The ACDs 14, 16 may be legacy systems or newer automatic contact distributors. In the case where the ACDs 14, 16 are a mix of conventional and legacy systems, a respective terminal adapter 18, 20 may be used to adapt the instruction sets and protocols of the ACDs 14, 16 to the host 12.

The host 12 may include one or more command and control servers 22. The servers 22 may be accessed by one or more desktops 26 operating on a PC connected to the host 12.

The host 12 and servers 22 may be used to provide administrative and control support for enhanced use of the ACDs 14, 16. For example, the ACDs 14, 16 may be located in remote geographic areas and process contacts (calls) with clients through a local connection to one or more communication systems (e.g., the PSTN, the Internet, etc.). As the calls are processed by the ACDs 14, 16, a supervisor working through the desktops 26 may monitor a call loading of the ACDs 14, 16. By being able to monitor a loading of each ACD 14, 16, the supervisor may adjust the number of agents available for each call type and even the routing of calls among the ACDs 14, 16.

Turning now to the host 12, in specific, the functionality of the host 12 is dependent upon a relatively complex set of software features and functions. Because of the number and complexity of the software features used within the host 12, the initialization and start up of software features on the host 12 is subject to a number of potential problems. For example, when the server 22 is loaded into the host 12, the server 12 is typically loaded without security features (e.g., passwords). Once loaded, a designated administrative user working through a desktop 26 may access the host 12 through the Internet or otherwise to start up (initialize) the server 22. Initialization may include adding the names and passwords of authorized users and providing a set of access rights for each user.

Servers 22 are typically loaded into a system 12 without interface addresses or security features. In order to activate the server 22, an administrative user working through a desktop 26 may access the host 12 and begin setting up the server 22.

Under illustrated embodiments of the invention, the server 22 is provided with a start up configuration (CONFIG) file 28 for use during start up and installation of the server 22. In order to provide security, the start up configuration file is provided with a predetermined user identifier (e.g., name, descriptive term, etc.) of the person assigned to install and activate the server 22 in a first field of the file 28. A second field of the file 28 may be left blank (i.e., no password is present within the second field). In one particular illustrated embodiment, the user identifier may be a character string (e.g., "UCCADMIN") descriptive of the person assigned to initializing the server 22.

The start up configuration file 28 also contains a set of access rights. Since the person assigned to install the server 22 would usually need universal rights, the set of access right provided within the configuration file 24 may be universal.

In order to start up and otherwise activate the server 22, the administrative user may log into the desktop 26 and, subsequently, the host 12 as a Windows user by entering a user name and password. The desktop( ) 26 and/or host 12 may separately authenticate the user name and password of the user.

The user may then locate and activate a server installation application 36. Upon activation of the installation application 36, the installation application 36 may prompt the administrative user for an initial user name. The installation program 36 receives the initial user name and writes it into the server start up configuration file 28. The installation program 36 may then install and activate the installed server 22.

In response, the server 22 starts and reads the initial user name (i.e., UCCADMIN) from the start up configuration file 28. Since no users exist in the server database, the initial user name is added to the empty database.

Once the server 22 has been activated, the user access the server 22 and the server 22 may also download a server client 32 to the desktop 26. The client 32 may present the user with a Windows log in screen requesting that the user enter a user identifier into a first editable field (interactive window) labeled NAME and a password into a second editable field (interactive window) labeled PASSWORD. In response, the user may enter the predetermined user identifier (e.g., UCCADMIN), and a password, and activate the ENTER softkey.

In response, the server client 32 composes a log in message that is sent back to the server 22. The user identifier is included within a first field of the log in message and the password in included within the second field.

In response, the server 22 receives the log in messages and uses a preexisting authentication mechanism (e.g., the WINDOWS authentication mechanism) 34 to log the user into the server 22. As a first step, the server 22 may compare the name and password received through the server client 32 with the name and password provided by the WINDOWS authentication mechanism 34 (i.e., the name and password that the user provided in order to log into the desktop 26 and/or host 12). If the two identifiers match, then the user is assumed to be an authorized user.

As a second step, the server 22 compares the contents of the first field of the log in message (i.e., the entered user name) provided through the server client 32 with the user name (i.e., UCCADMIN) written into the server database.

If the two user names match, then the server 22 logs the user into the server 22 as a Windows user using the credentials passed. If the Windows log in is successful, the server 22 encrypts the password and places the password into the server database. Thus, the initial user is configured without a password passed through the server client 32. The password is authenticated for the server 22 without the user specifying the password because the password is leveraged by Windows. In effect, the password is automatically configured into the server database without the password being explicitly specified through the user client 32.

The authentication mechanism 34 may also retrieve a set of rights and privileges of the user 26. In this case, the user working through the desktop 26 may be given universal rights.

Once signed into the server 22, the user 26 may change his/her password at will. The only prerequisites are that the server 22 is executing and that the user has already signed into the host 12 before changing his/her password.

In this case, the user attempts to sign into the server 22 using the server client 32. The server 22 logs the user in as a Windows user using the credentials passed. In this case, the server 22 verifies that the user is authorized by reference to the authentication mechanism 34 as described above. If the log in is successful, the server 22 encrypts and places the new password into the server database. Thus, the user changes his password without specifying the old and new password to the server 22 through the server client 32. The new password is authenticated for the server 22 without any the user specifying that the password has been changed by leveraging the password changing features of Windows. As such, the password is automatically changed within the server 22 without the password being explicitly specified.

Once the user 26 is logged into the server 22, the user 26 may also add other users. In this case, the only prerequisites are that the server 22 is executing and that the initial user has been added with password as a Windows user to the host 12.

In this case, the user 26 (the user may or may not be the initial user discussed above) configures a new user and specifies whether the new user is an administrator or not. Configuration, in this case, means specifying a user name and a set of rights.

The new user may sign into his desktop 26 using a user name and password. The user 26 may then access and log onto the host 12. The host 12 may display a set of icons, including an icon of the server 22. The new user 26 selects the icon of the server 22 and the server 22 downloads a user client 32 to the user 26. The new user 26 then attempts to sign into the server 22 through the client 32 by specifying the new user's credentials (i.e., the new user's name and password). The server 22 logs the new user into Windows using the credentials passed. The server 22 verifies that the new user is authorized via reference to the authentication mechanism 34 as described above.

If the log in is successful, the server 22 encrypts the password and places it into the server database. Thus, the new user is configured without a password. The password is authenticated for the server 22 without the new user specifying a password by leveraging the password handling capabilities of Windows. In effect, the password is automatically configured into the server database without the password being explicitly specified.

The server 22 may also log a user 26 into one or more target systems 14, 16. In this case, the user 26 must first log into the server 22. The user 26 may then log into the target system 14, 16 giving a predetermined set of credentials that would be accepted by the target system 14, 16. If the log on is successful, then the server 22 stores the credentials provided by the user 26. The next time that the user 26 signs into the server 22, the server 22 automatically signs the user 26 into the target systems 14, 16, so long as the credentials are still valid. Thus, a user 26 does not need to explicitly sign onto target systems 14, 16 each time that the user logs onto the server 22. The target system credentials for a user 26 are automatically configured each time that the user signs into the server 22.

A specific embodiment of method and apparatus for securing accessing a computer system during startup has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of accessing a server within a computer system comprising:
   providing a startup CONFIG file or database table for use during initialization of the server;
   providing a predetermined initial user identifier without an associated password within the startup CONFIG file or database table prior to initial activation of the server;
   an initial user requesting an initial activation and initialization of the server, the server downloading a server client to the user in response to initial server activation, and the user logging into a host of the server as a Windows user using the server client and the initial user identifier, and automatically configuring a password into a database of the hardware without a password being passed through the server client;
   the user providing the predetermined user identifier without providing an associated password, and an installation application initially installing and activating the server in response to the user identifier without a password; and
   the server logging the user initially into the server under the predetermined user identifier without a password;
   wherein the server is a hardware server.

2. The method of accessing the computer system as in claim 1 further comprising the user accessing the server via a predetermined URL.

3. The method of accessing the computer system as in claim 1 further comprising prompting the user for a password.

4. The method of accessing the computer system as in claim 3 further comprising prompting the user for a user name.

5. The method of accessing the computer system as in claim 4 further comprising saving the name and password in a system database.

6. The method of accessing the computer system as in claim 1 further comprising the system using a preexisting WINDOWS authentication mechanism to log the user into the server.

7. The method of accessing the computer system as in claim 1 further comprising providing the user with universal access rights and adding the user identifier to an empty server database of security data.

8. The method of accessing the computer system as in claim 1 further comprising defining the predetermined user identifier as a descriptor of the user.

9. The method of accessing the computer system as in claim 1 further comprising the user entering a name of another user.

10. The method of accessing the computer system as in claim 9 further comprising the other user logging into the system without a password.

11. An apparatus for accessing a server within a computer system comprising:
    a startup CONFIG file or database table for use during initialization of the server;
    a predetermined initial user identifier without an associated password within the startup CONFIG file or database table;
    means for requesting an initial activation of the server by an initial user, the server downloading a server client to the user in response to initial server activation, and the user logging into a host of the server as a Windows user using the server client and the initial identifier;
    means for automatically configuring a password into a database of the server without a password being passed through the server client;
    means for use by the user for entering the predetermined user identifier without
    providing an associated password and for initially installing and activating the server in response to the user identifier without a password; and
    means for within the server, logging the user initially into the server under the predetermined user identifier without a password;
    wherein the server is a hardware server.

12. The apparatus for accessing the server as in claim 11 further comprising a URL used by the user for accessing the server.

13. The apparatus for accessing the server as in claim 11 further comprising the system using a preexisting WINDOWS authentication mechanism to log the user into the server.

14. The apparatus for accessing the server as in claim 11 further comprising means for providing the user with universal access rights.

15. The apparatus for accessing the server as in claim 11 where the predetermined user name further comprises a descriptor of the user.

16. The apparatus for accessing the server as in claim 11 further comprising a screen that prompts the user for a password.

17. The apparatus for accessing the server as in claim 16 further comprising a screen that prompts the user for a user name.

18. The apparatus for accessing the server as in claim 17 further comprising a database that saves the name and password.

19. The apparatus for accessing the server as in claim 11 further comprising an access file created by the user for another user within the server.

20. The apparatus for accessing the server as in claim 19 wherein the access file of the other user further comprises a name of the other user.

21. The apparatus for accessing the server as in claim 20 further comprising a preexisting WINDOWS authentication device that logs the other user into the server without an explicitly entered password.

22. An apparatus for accessing a server computer within a computer system comprising:
    a startup CONFIG file or database table for use during installation and activation of the server;
    a predetermined initial user identifier without an associated password stored within the startup CONFIG file or database table prior to initial activation of the server;
    a user desktop device that requests an initial activation and initialization of the server computer, and the server downloading a server client to the user desktop in response to initial server activation;
    the server client on the user desktop receiving the predetermined user identifier without a password from the user, and an installation application which initially installs and activates the server in response to the user identifier without a password, the user logging into a host of the server as a Windows user using the server client and the initial identifier, and automatically configuring a password into a database of the server without a password being passed through the server client; and a preexisting authentication device within the server that initially logs the user into the server under the predetermined user identifier without a password;

wherein the server is a hardware server.

23. The apparatus for accessing the server as in claim 22 further comprising a URL used by the user for accessing the server.

24. The apparatus for accessing the server as in claim 22 wherein the startup CONFIG file or table further comprising an access and privileges indicator granting the user universal access rights.

25. The apparatus for accessing the server as in claim 22 where the predetermined user name further comprises a descriptor of the user.

26. The apparatus for accessing the server as in claim 22 further comprising a screen that prompts the user for a password.

27. The apparatus for accessing the server as in claim 26 further comprising a screen that prompts the user for a user name.

28. The apparatus for accessing the server as in claim 27 further comprising a database that saves the name and password.

29. The apparatus for accessing the server as in claim 22 further comprising an access file created by the user for another user.

30. The apparatus for accessing the server as in claim 29 wherein the access file of the other user further comprises a name of the other user.

31. The apparatus for accessing the server as in claim 30 further comprising a preexisting WINDOWS authentication device that logs the other user into the server using a password previously entered for becoming a Windows user;

the user providing the predetermined user identifier without providing an associated password, and an installation application initially installing and activating the server in response to the user identifier without a password; and the server logging the user initially into the server under the predetermined user identifier without a password.

\* \* \* \* \*